Oct. 12, 1943.  W. A. RAY  2,331,502
CONTROL SYSTEM
Filed Dec. 6, 1941  5 Sheets-Sheet 1

INVENTOR,
WILLIAM A. RAY
By John H. Rouse,
ATTORNEY.

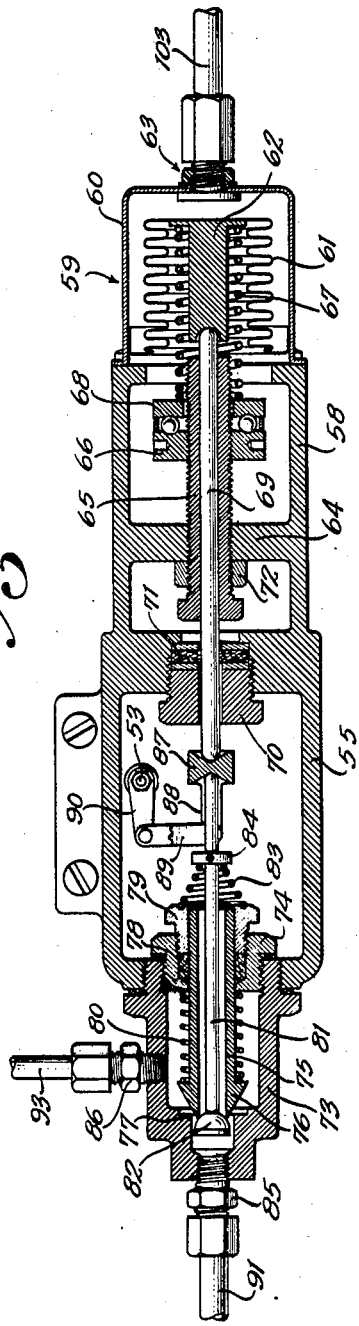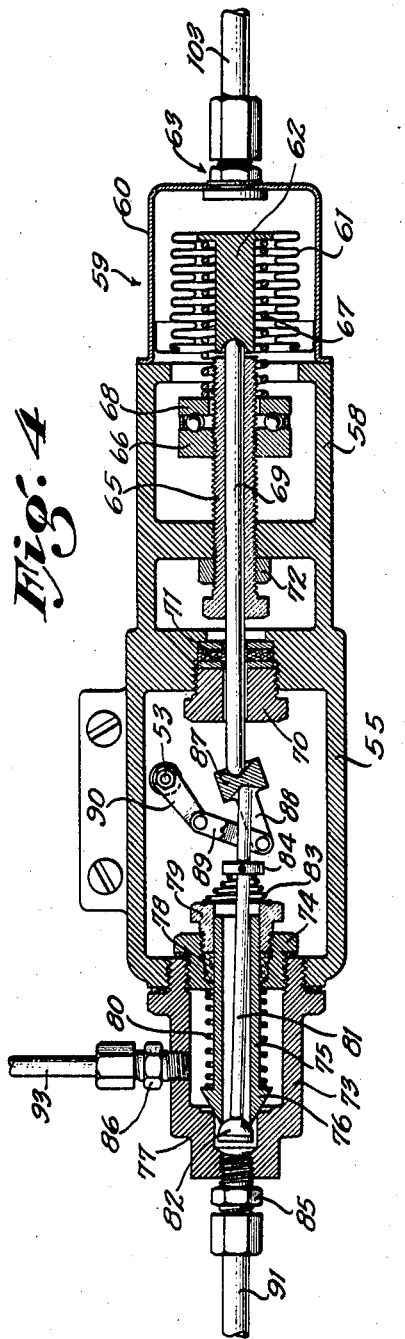

Oct. 12, 1943.  W. A. RAY  2,331,502
CONTROL SYSTEM
Filed Dec. 6, 1941  5 Sheets-Sheet 3
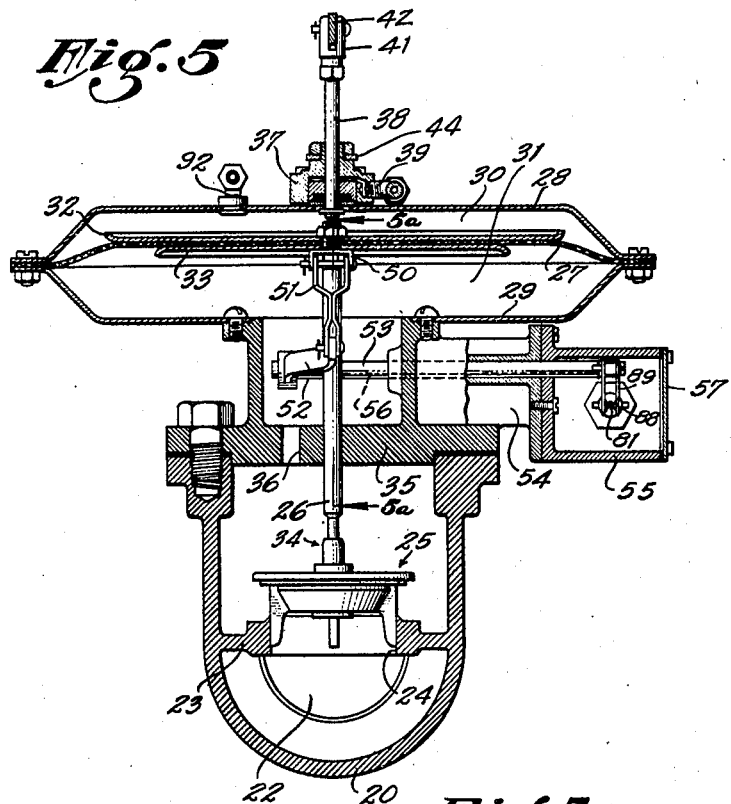
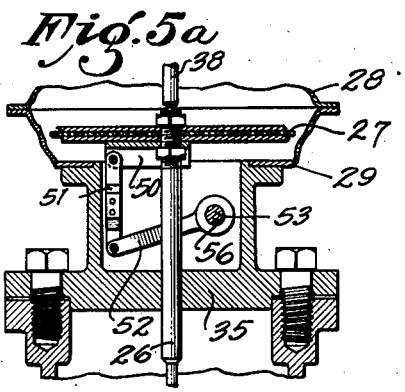
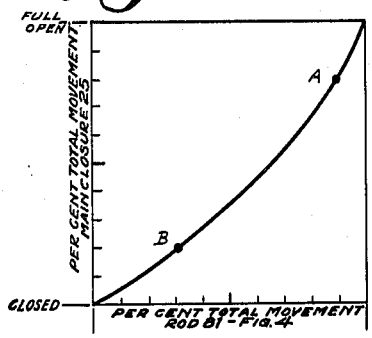
INVENTOR,
WILLIAM A. RAY
By John H. Rouse,
ATTORNEY.

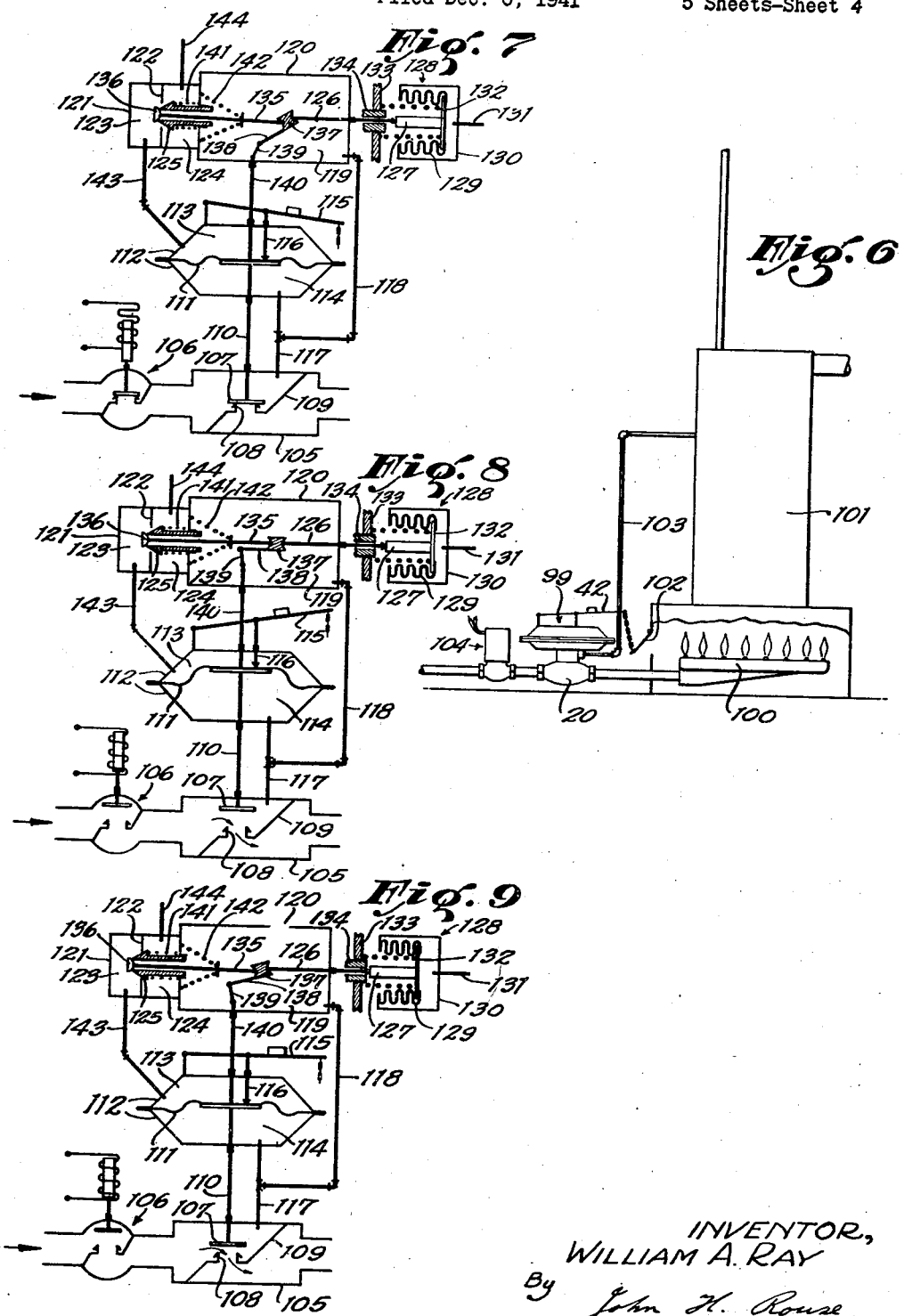

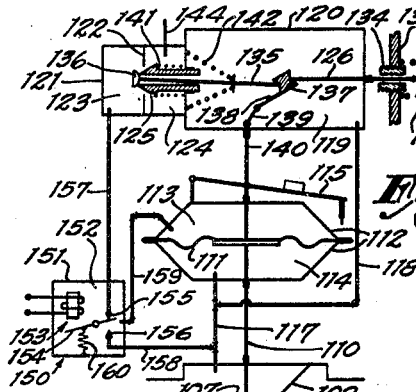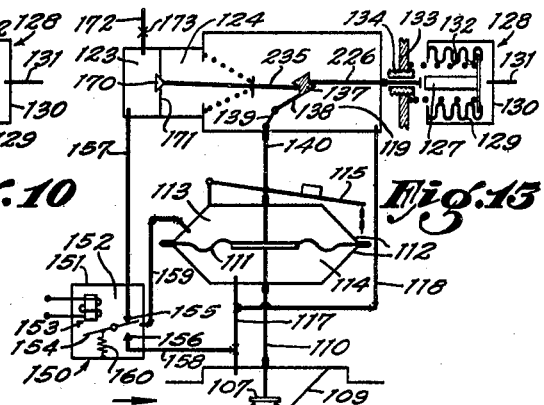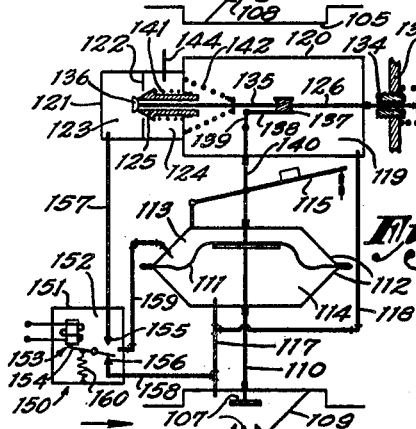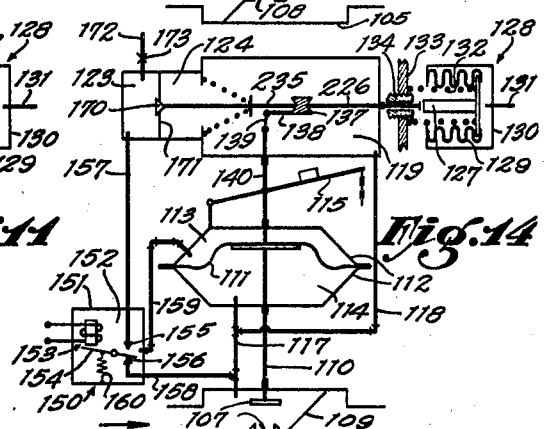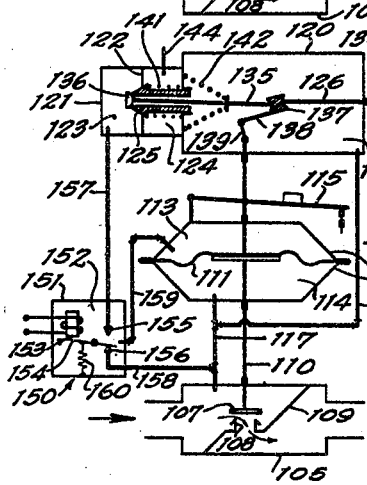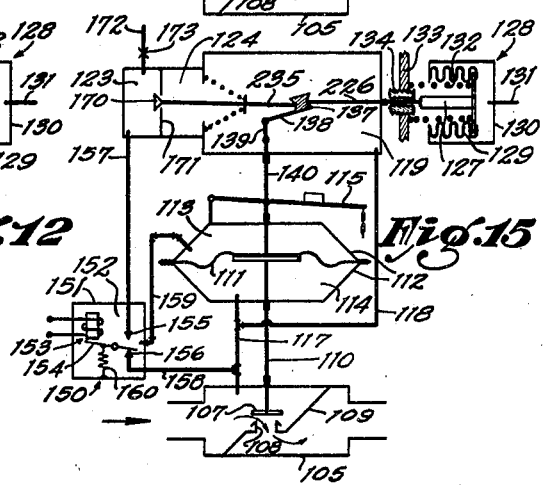

Patented Oct. 12, 1943

2,331,502

UNITED STATES PATENT OFFICE 2,331,502

CONTROL SYSTEM

William A. Ray, Los Angeles, Calif.

Application December 6, 1941, Serial No. 421,882

4 Claims. (Cl. 121—41)

My present invention relates to fluid pressure operated motors of the type wherein a partition or wall is moved by variation of the fluid pressure applied thereto, the movement of the wall being transmitted to a device to be operated such as the closure member of a fluid control valve.

A general object of my invention is to provide means for controlling the operation of such a motor, the present invention being an improvement on that disclosed in my U. S. Patent No. 2,046,882, issued July 7, 1936.

Another object is to provide means for positioning the movable element of a fluid pressure operated motor in accordance with variation in a controlling condition such as temperature, pressure, liquid level, or the like, which variation in condition may be the result of the operation of the motor in its control of means such as a fluid control valve, damper, or electrical rheostat.

Another object is to provide valve means for controlling the pressure of the fluid in the motor, and means responsive to the operation of the motor for modifying the actuation of the controlling valve means.

Another object is to provide means connected to the movable wall of the motor for actuating the pressure controlling valve means in a direction opposite to that in which the valve means is actuated by means responsive to a controlling condition so that movement of the wall is intermittently arrested.

Another object is to provide positioning means of the character described in the preceding objects which is effective throughout the full range of movement of the motor wall whereby the wall is maintained in any of a plurality of positions in accordance with the magnitude of a controlling condition.

Another object is to provide positioning means of the type set forth in the previous object whereby tendency of the motor to "hunt" or deviate from a predetermined position is prevented.

Another object is to provide positioning means, of the character described in the preceding objects, which is so constructed and arranged that the effect upon the valve means, produced by the movement of the motor wall in one direction, is incremental.

Another object is to provide means readily adjustable to limit the extent of movement of the motor wall regardless of the magnitude of the controlling condition.

Another object is to provide a novel "three-way" valve structure wherein the closure means has an intermediate moved position wherein no fluid flow is permitted.

Other objects and advantages of my invention will be found in the description, the drawing and the appended claims.

For complete understanding of the invention, reference may be had to the following detailed description and accompanying drawings wherein:

Figures 3 and 4 are similar sectional views, taken along the line 3—3 of Fig. 2, of valve means for controlling the operation of the main valve shown in Fig. 1, the parts being shown in the figures in positions assumed in operation;

Figure 5 is a main section taken along the irregular line 5—5 of Fig. 2;

Figure 5a is a fragmentary section taken along the line 5a—5a of Fig. 5, the parts being shown in this figure in the positions which they assume when the diaphragm 27 is depressed;

Figure 5b is a chart indicating the ratio of movements of the main closure member 25 and the control valve rod 81 at various positions of the main closure member;

Figure 6 is a diagrammatic view showing the application of the valve shown in Figs. 1–5a to the control of a gas-heated steam boiler;

Figures 7, 8 and 9 are similar diagrammatic views of a control system embodying my invention, the parts being shown in the several views in different positions assumed in operation;

Figures 10, 11 and 12 are similar diagrammatic views of a modified form of control system, and;

Figures 13, 14 and 15 are similar diagrammatic views of a still further modified control system.

Figure 1:
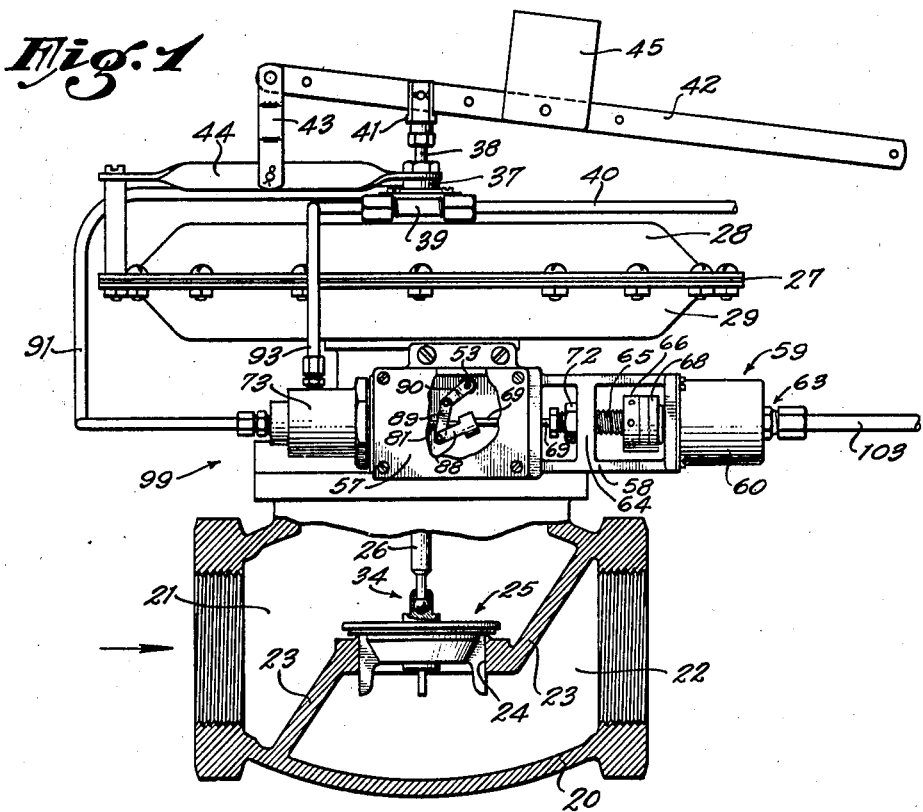
Figure 1 is a side elevation (partly in section) of a fluid pressure operated fluid-control valve embodying my invention.
Figure 2:
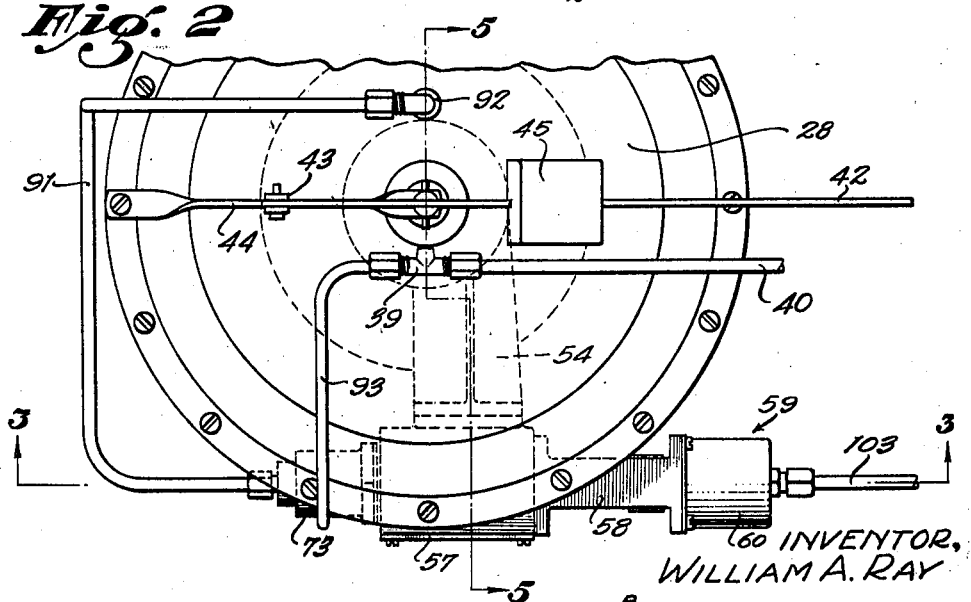
Figure 2 is a fragmentary plan view of the valve shown in Fig. 1.

Referring first to Figs. 1–5a the numeral 20 indicates a main valve casing having an inlet 21 and an outlet 22 separated by a partition 23 provided with a valve port 24, cooperable with which is a closure member generally indicated at 25. As best seen in Figs. 5 and 5a, the closure member is connected to an operating stem 26, the upper end of which is secured to a flexible diaphragm 27, the marginal portion of which is interposed between the adjoining flanges of a pair of dished plates 28 and 29 to form an upper and a lower pressure chamber 30 and 31, respectively. A pair of stiffening plates 32 and 33 are provided on the stem on opposite sides of the diaphragm, and the lower end of the stem is connected to the closure member by a lost-motion ball and socket device 34. Interposed between the valve casing and the housing formed by plates 28 and 29 is a generally cup-shaped spacing member 35 having in its bottom wall a central opening wherein the stem 26 is reciprocable. Also in the bottom wall of member 35 is an opening 36 which provides fluid communication between the inlet 21 and the pressure chamber 31, the lower dished member 29 having a central opening coinciding with the open upper end of member 35.

Mounted on the top of plate 28 is a member 37 which provides guiding support for a rod 38 which extends within chamber 30 so that its lower end abuts the upper end of stem 26. Member 37 provides a relatively fluid-tight guide for rod 38, any possible leakage around this rod escaping to a T-fitting 39 threaded in the member and to which a vent pipe 40 is connected, which pipe may be extended to the place of the furnace if the valve is employed for the control of combustible fluid such as gas. The bifurcated upper end 41 of rod 38 is pivotally connected to an arm 42 which is pivoted at one end on a link 43 mounted on a strap 44 attached to the member 37 and to the flanges of plates 28 and 29. The free end of arm 42 is downwardly biased by a weight 45, adjustably mounted thereon.

Also secured to the stem 26 below the diaphragm plate 33, is a short arm 50 which is pivotally connected to one end of a link 51, the other end of the link being pivoted on an off-set arm 52 secured to a rod 52 which is journaled in an extension 54 of the member 35. Secured to the outer surface of the extension 54 is a control valve housing 55, through an opening in the adjoining wall of which the rod 53 extends, the rod being grooved at 56 to provide fluid communication between the main valve inlet 21 and the interior of housing 55. The open outer end of housing 55 is closed by a cover plate 57. Extending from the right-hand end (as seen in Figs. 1–4) of the housing 55 and integral therewith is a bracket 58, on the outer end of which is mounted a pressure operated device generally indicated at 59 and comprising a cup-shaped housing 60, to the inner wall of which is sealingly secured the open end of an expansible-contractible metallic bellows 61. To the closed end wall of the bellows, is secured an operating stem 62. The housing 60 is provided with a fitting 63 by means of which fluid under pressure may be supplied to the space between the bellows and the housing to move the stem. Threaded in an intermediate portion 64 of the bracket 58 is an elongated hollow screw 65 which carries an adjusting nut 66, between which nut and the head of stem 62 a spring 67 is compressed. To facilitate adjustment of this nut against the tension of spring 67, a ball-bearing thrust plate 68 is provided between the spring and the nut.

Guided in the bore of screw 65 is a first rod 69, the right-hand end of which is in engagement with the stem 62, a depression formed in the end of the stem serving to maintain axial alignment of the rod and the stem. The left-hand end portion of rod 69 extends through a bushing 70 threaded in the right-hand end wall of housing 55, packing disks 71 being provided to prevent leakage of fluid around the rod. The right-hand end of screw 65 provides a stop limiting movement in a left-hand direction of stem 62, a nut 72 serving to lock the screw in adjusted position.

Threaded in an opening in the left-hand end wall of housing 55 is a hollow member 73, and threaded in the right-hand end of the bore of this member is a bushing 74 wherein a tubular member 75 is slidable. This member has a conical left-hand end portion 76 which cooperates with a valve seat 77 formed in the member 73. Leakage of fluid around the tubular member 75 is prevented by a packing washer 78 which is compressed around the member by a nut 79. Member 75 is urged in a left-hand direction by a relatively light spring 80 compressed between bushings 74 and the shoulder of the conical closure portion 76. Within the tubular member 75 is a second rod 81 which carries on its left-hand end a semi-spherical closure member 82 which cooperates with a seat provided by the left-hand end of member 75, the closure member 82 being urged to closed position by a spring 83 compressed between the nut 79 and a collar 84 adjustably secured to rod 81, the force exerted by spring 83 being appreciably greater than that of spring 80. Fittings 85 and 86 provide means for conveying fluid controlled by the closure members 76 and 82, fitting 85 being connected to a pipe 91, which in turn is connected to a fitting 92 which provides communication with the upper diaphragm chamber 30; and fitting 86 being connected by a pipe 93 to the T-fitting 39, from which vent pipe 40 leads to the atmosphere or to a furnace chamber.

Interposed between the rods 69 and 81 is a member 87 which is provided on its opposite sides with conical depressions for receiving the ends of these rods. Pivoted on the arm 88 of member 87 is a link 89 which in turn is pivoted on another arm 90 secured to the end of rod 53. When rod 53 is rotated by movement of diaphragm stem 26, the positions of the ends of rods 69 and 81 in the corresponding recesses of member 87 are changed, thereby varying the effective combined length of rods 69 and 81.

In Fig. 6 I have shown the valve 99, hereinbefore described and illustrated in Figs. 1–5a, connected to supply fuel to a gas burner 100 for heating a steam boiler 101, the arm 42 of the valve being connected to a hinged door 102 which is adapted to control supply of secondary air to the burner. For the actuation of the pressure operated device 59, a pipe 103 is provided which connects this device with the steam space above the water in the boiler. Connected ahead of valve 99 is an electrically operated solenoid valve 104 which provides complete on-and-off control of the fuel.

The operation of the valve shown in Figs. 1–5a will more readily be understood by consideration of the equivalent valve diagrammatically shown in Figs. 7–9. In these figures, the numeral 105 indicates a main valve casing, to the inlet of which is connected a solenoid valve 106. When the solenoid valve is open, fluid flow through the casing is controlled by a closure member 107 cooperating with a valve port 108 provided in a partition 109. The closure member is connected by a stem 110 to a flexible diaphragm member 111 which separates the interior of a housing 112 to provide an upper 113, and a lower 114, pressure chamber. Pivoted on the housing 112 is a damper arm 115 which is actuated in response to movement of the diaphragm by a rod 116 extending within the upper pressure chamber into engagement with the diaphragm member. The lower diaphragm chamber 114 is directly connected, by a pipe 117, with the inlet of the main valve. Also connected to the main valve inlet, by a pipe 118, is a chamber 119 defined by a housing 120. Adjoining this housing is another housing 121 which is divided internally by a partition 122 to form a pair of chambers 123 and 124. Cooperable with an opening or port formed in the partition 122 is a closure member 125 which is slidable in an opening formed in the common wall between housings 120 and 121. Extending through the right-hand end wall of housing 120 is a first rod 126, the outer end of which is in engagement with the stem 127 of a pressure operated device 128 comprising a bellows 129 secured to the open end of a cup-shaped housing 130. The space between the bellows and the housing is adapted to be supplied, by a pipe 131, with fluid under pressure to operate the bellows and thereby the stem 127; a spring 132, compressed between a fixed plate 133 and the inner end of the bellows, urging the bellows in a right-hand direction. Threaded in an opening in plate 133 is an adjustable stop member 134 which limits the movement in a left-hand direction of the rod 126 by the stem 127. A second rod 135 extends through the hollow closure member 125 and is provided with a head 136 which cooperates with the left-hand end of member 125 to control fluid flow therethrough. Interposed between the adjacent ends of rods 126 and 135 is a member 137 which is provided on its opposite ends with conical depressions for receiving the ends of these rods. Arm 138 of member 137 is connected by a link 139 to a rod 140 which extends through the walls of housings 120 and 112 and is secured to the diaphragm member 111. Closure member 125 is biased in a left-hand direction by a spring 141 and the rod 135 is biased in a right-hand direction by a spring 142; the force of the latter being greater than that of spring 141, the closure member 125 is normally maintained in open position with respect to partition 122, with head 136 closing the passageway through the closure member 125.

The operation of the control system shown in Figs. 7, 8 and 9 will now be described, it being assumed that (as in the system shown in Fig. 6) the inlet of the solenoid valve 106 is connected to a supply of fluid fuel such as gas, that the outlet of valve casing 105 is connected to a burner for heating a steam boiler, and that the pressure operated device 128 is connected by pipe 131 to the space above the water in the boiler. Before the system is put into operation, i. e., solenoid valve 106 being closed and the boiler cold, the parts will be in the positions shown in Fig. 7. The main closure member 107 is in its downmost position due to the fact that the pressures in chambers 113 and 114, above and below the diaphragm, are equal and the diaphragm is gravity biased. It will be noted that the upper diaphragm chamber 113 is now in communication with the atmosphere through pipe 143, chamber 123, opening in partition 122, chamber 124, and vent pipe 144. The lower diaphragm chamber 114 is also at substantially atmospheric pressure due to the escape of fluid from the casing 105, to which it is connected by pipe 117, when the solenoid valve 106 was previously closed. There being substantially no fluid pressure applied to the pressure operated device 128, rods 126 and 135, under the controlling bias of spring 142, are in such positions that communication between chambers 119 and 123 (through the interior of member 125) is closed by the head 136, and the opening in partition 122 between chambers 123 and 124 is unobstructed. Since the diaphragm is in its downmost position, the cam member 137 is in such position that the effective combined length of rods 126 and 135 is the shortest.

If solenoid valve 106 is now opened, fluid flows into the main valve casing and thence by pipe 117 into the lower diaphragm chamber 114, forcing the diaphragm upward to open the main closure member 107; fluid in the upper diaphragm chamber 113 being vented to the atmosphere. The result is that the parts assume the positions shown in Fig. 8. The member 137 having been brought to its horizontal position in which the effective combined length of rods 126 and 135 is the greatest, the closure member 125 is somewhat closer to partition 122. By the opening of the main closure member 107, fuel passes to the burner where it is ignited by means such as a constantly burning pilot burner. The parts remain in the positions shown in Fig. 8 until steam pressure in the boiler, due to the heat of the burner, rises to a point at which it is sufficient to overcome the force of spring 132 of the pressure operated device 128, and the rods 126 and 135 are gradually moved in a left-hand direction. It will be understood that the member 137 offers substantially no resistance to such movement on account of its pivoted connection to link 139.

Upon continued increase of steam pressure, a point is reached at which the closure member 125 is brought into engagement with the opening in partition 122. At this instant, the upper diaphragm chamber 113 is sealed from the atmosphere. Further movement of rod 135, due to still increased steam pressure, unseats the head 136 and fluid passes from the main valve inlet through pipes 117 and 118, chamber 119, the passageway in closure member 125, chamber 123, and pipe 143 to the upper diaphragm chamber 113, with the result that the pressure difference in the diaphragm chambers is reduced and the diaphragm accordingly moves downward. However, such downward movement of the diaphragm, through member 137, immediately reduces the effective combined length of rods 126 and 135, with the result that head 136 is reseated and further downward movement of the diaphragm is arrested, the parts assuming a position such as shown in Fig. 9. If the steam pressure continues to rise, head 136 will again be momentarily opened, and then reclosed in response to diaphragm movement, so that the diaphragm assumes a still lower position. The main closure member 107 having been brought closer to its seat, gas flow to the burner is reduced, a point finally being reached at which the gas flow is just sufficient to maintain the required pressure of steam in the boiler. If for some reason the steam pressure is reduced, movement of the rods 126 and 135 in a right-hand direction occurs, with the result that closure member 125 is moved away from its engagement with the opening in partition 122, the fluid compressed in the upper diaphragm chamber escapes to the atmosphere, and the diaphragm is accordingly forced upward by the fluid pressure below it. However, the effective combined length of rods 126 and 135 is thus now increased and closure member 125 immediately reseats, with the result that the diaphragm is checked in a slightly raised position.

It will thus be seen that the position of the diaphragm, and hence of the main closure member 107, is accurately adjusted in accordance with the pressure of the steam, any tendency of the diaphragm to "hunt" or deviate from position being checked by the effect of cam member 137 on rod 135.

The adjusted position of the stop member 134 limits movement in a left-hand direction of the stem 127 of the pressure operated device and hence limits the movement of the main closure member 107 toward its seat. However, it will be understood that, if the burner is capable of full modulation, i. e., will burn properly over the entire range of fuel supply from minimum to maximum, the stop member 134 may be so adjusted that the main closure member can completely close. However, most burners are not capable of such operation and therefore additional means, such as the solenoid valve 106, is usually required for controlling on-and-off supply of the fuel.

In the operation of some devices, it is desirable that the control of the positioning of the operated member be closer when the member is nearer to one of its limiting positions than the other, i. e., that the effect upon the control valve by unit of movement of the operated member be increased when the same approaches one of its limiting positions, so that the slightest movement of the member is immediately checked by the operation of the control valve. Such an effect is particularly desirable in the system described in connection with Figs. 6–9 for the reason that when the main closure member 107 is at a considerable distance from its seat, relatively large movements of the main closure member have but little effect upon the rate of flow of fuel to the burner; but when the closure member is very close to its seat, a very small change in its position effects relatively great change of flow. Accordingly, I have so constructed and arranged the means shown in Figs. 1–5a, whereby movement of the diaphragm 27 (and hence that of the main closure member 25) imparts movement to the control valve rod 81, that the effect upon the rod 81 produced by the movement of the closure member 25 is incremental (i. e., becomes progressively greater) as the same approaches its seat. This effect, in the particular embodiment of the invention disclosed in Figs. 1–5a, is due mainly to the shape of the cam member 87. When the main closure member is fully open as shown in Fig. 5, the corresponding position of the cam member 87 is that shown in Fig. 3; and when the closure member is on its seat (with valve stem 26 and diaphragm 27 in the positions of Fig. 5a), the member 87 is in the position shown in Fig. 4. It is apparent that slight rotation of the cam member from its position as shown in Fig. 3 has but little effect upon rod 81, while the same degree of rotation of the cam from its position as shown in Fig. 4 has greater effect upon rod 81; in other words, the "rate" of the cam increases as it approaches the position of Fig. 4. The effects produced by the cam are so pronounced that the overall effect of movement of the main closure member on rod 81, through the various connections, is as described—in spite of the fact that the effect upon cam 87 produced by unit rotation of arm 90 from its inclined position shown in Fig. 4 is less than from its horizontal position of Fig. 3. The curve of the chart of Fig. 5b indicates the actual relative percentage movements of the main closure member 25 and the control valve rod 81 when interconnected by the parts shown in Figs. 1–5a. From inspection of the curve it will be observed that, as the closure member approaches its closed position, the effect upon the control valve rod is increased. For example, 20% movement of the closure member from its "full-open" position (point A) effects approximately 10% movement of rod 81; while 20% movement of the closure member from its "closed" position (point B) effects approximately 30% movement of rod 81. Obviously, if desired, the connecting parts could be modified so as to increase or decrease this effect.

In Figs. 10, 11 and 12, I have shown a modification of the system disclosed in Figs. 7, 8 and 9, in which modification an electrically operated three-way pilot valve, generally indicated at 150, is employed to control operation of the main valve between open and closed positions, thereby eliminating the necessity of the solenoid valve shown in Figs. 7–9. The pilot valve 150 comprises a housing 151 defining a chamber 152, wherein is mounted an electromagnet 153 which is adapted when energized to attract the adjacent end of a pivoted armature 154, the other end of which cooperates with jets 155 and 156 to control fluid flow through pipes 157 and 158, respectively connected thereto. The armature is biased by a spring 160, normally into engagement with the jet 155. When the armature is unattracted, the parts of the system are in the positions show in Fig. 10. When the electromagnet 153 is energized, the armature is moved out of engagement with jet 155 and into engagement with jet 156, with the result that fluid can then escape from the upper diaphragm chamber 113 by a pipe 159, chamber 152, jet 155, pipe 157, chambers 123 and 124, and vent pipe 144, to the atmosphere. Fluid pressure applied to the lower diaphragm chamber 114 through pipe 117 (it being assumed that the left-hand end of the main valve casing 105 is connected directly to a source of fluid fuel under pressure) forces the diaphragm upward, the parts assuming the positions shown in Fig. 11. Operation of the system in the manner described above in connection with Figs. 7–9 is thus initiated, the main closure member 107 being positioned (as shown in Fig. 12) in accordance with the magnitude of a controlling condition, such as the pressure of steam in a boiler. The operation of the electromagnet 153 may conveniently be responsive to a condition such as steam pressure, or the temperature of a space heated by the steam. When the steam pressure or the temperature reaches a predetermined maximum, the electromagnet is deenergized, with the result that the armature returns to the position shown in Fig. 10 closing jet 155, whereupon fluid can pass from the inlet of the main valve through pipes 117 and 158, jet 156, chamber 152, and pipe 159 to the upper diaphragm chamber 113, thus equalizing the pressures above and below the diaphragm, the main closure member accordingly returning to its fully closed position.

In the still further modified system shown in Figs. 13, 14 and 15, a different form of valve means for controlling the position of the diaphragm is disclosed. In place of the "floating three-way" valve shown in the other systems, a rod 235 (corresponding to rod 135 in the systems of Figs. 7–9 and 10–12) carries a closure member 170 which cooperates with an opening in a partition 171 separating the chambers 123 and 124. In this modification, the latter chamber communicates directly with chamber 119, and chamber 123 (instead of chamber 124) is vented to the atmosphere by a pipe 172. When the system is in inoperative condition and the boiler cold, the closure member 170 is seated, rod 226 (corresponding to rod 126 of the other systems) being out of engagement with plunger 127 of the pressure operated device. When the pilot valve 150 is energized, fluid escapes from the upper diaphragm chamber 113 to the atmosphere through pipe 157, chamber 123, and pipe 172, which pipe has a restricted orifice 173 therein; the parts assuming the positions shown in Fig. 14. When, due to rise in steam pressure, closure member 170 is opened by the movement of rods 226 and 235, fluid from the inlet of the main valve casing flows into chamber 123 until its rate of flow (due to continued opening movement of closure member 170) exceeds that at which it can escape through the restriction 173 in the vent pipe, with the result that fluid pressure in chamber 113 is increased and the diaphragm moves downward. The result is that closure member 170 partially closes until its position is such that continuous flow into chamber 123 from the main valve inlet is equal to that through the vent pipe and the diaphragm remains in a lowered position, the parts assuming the positions shown in Fig. 15. Upon decrease of steam pressure, the closure member 170 momentarily assumes a still more closed position and the resultant upward movement of the diaphragm is again checked when the incoming flow of fluid is equal to the bleed.

By way of illustration, the systems of my invention have been described in connection with the control of a gas-heated steam boiler, the positioning valve means being actuated in accordance with the pressure of the steam. However, it is obvious that my invention is applicable to the control of other apparatus, particularly such as employs fluid fuel, gaseous or liquid. The pressure operated device for the positioning valve means could be arranged to be operated in response to change in other conditions, such as temperature, fluid level or the like. Furthermore, means other than the fluid pressure operated device shown could as well be employed for actuating the positioning valve means, such as, for example, bimetallic or expansion-rod means, or an electrically-energized heat motor.

I wish it to be understood that still further modifications may be made without departing from the spirit of my invention and that I intend therefore to be limited only by the scope of the appended claims.

This application is a continuation-in-part of my copending application Serial No. 376,137, filed January 27, 1941.

I claim as my invention:

1. In a fluid pressure operator: means defining a pressure chamber including a wall movable in response to change of fluid pressure in the chamber, valve means for controlling the pressure in said chamber, a first elongated reciprocable member for actuating said valve means, a second elongated reciprocable member actuated in response to changes in a controlling condition, and cam means operated by the movement of said wall for varying the effective combined length of the members, said cam means being so constructed and connected to the wall that unit increments of movement of the wall produce variable increments in the effective combined lengths of the members in accordance with the position of the wall so that the effect upon the movement of said valve means as said wall is moved in one direction becomes progressively greater.

2. In a fluid pressure operator: means defining a pressure chamber having a movable wall, valve means for varying the fluid pressure in said chamber to move said wall, a first member for actuating said valve means, a second member movable in response to change in a controlling condition for actuating said first member, and a cam member interposed between said members having a pair of opposed concave cam surfaces for receiving the adjacent ends of said members, said cam member being connected to said wall and so operated thereby as to modify the effect on said first member of movement of said second member, said cam surfaces having variable rate so that the effect upon said valve means due to movement of said wall becomes progressively greater as the wall moves in one direction.

3. In a fluid pressure operator: means defining a pressure chamber having a movable wall, valve means for varying the fluid pressure in said chamber to move said wall, a first member for actuating said valve means, a second member movable in response to change in a controlling condition for actuating said first member, a cam having surfaces interposed between said members and being movable therewith, and means interconnecting said cam and said wall whereby movement of the wall effects rotation of the cam so that the effect on the first member of movement of the second member is modified, said cam surfaces having a variable rate so that the effect on said valve means due to movement of the wall becomes progressively greater as the wall moves in one direction.

4. In a fluid pressure operator: means defining a pressure chamber having a movable wall, valve means for varying the fluid pressure in said chamber to move said wall, a first elongated reciprocable member for actuating said valve means, a second elongated reciprocable member actuated substantially along the longitudinal axis of said first member in response to change in a controlling condition, and cam means operated by the movement of said wall for varying the effective combined length of the members, said cam means being interposed between said members and freely movable therewith substantially along said axis, said cam means being so constructed and connected to the wall that unit increments of movement of the wall produce variable increments in the effective combined lengths of the members in accordance with the position of the wall so that the effect upon the movement of the valve means becomes progressively greater as the wall is moved in one direction.

WILLIAM A. RAY.